United States Patent
Bueno Ceresuela

(10) Patent No.: US 6,221,409 B1
(45) Date of Patent: Apr. 24, 2001

(54) ROTATABLE FROZEN CONFECTIONARY PRODUCT

(75) Inventor: Jorge Bueno Ceresuela, Barcelona (ES)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/383,194

(22) Filed: Aug. 26, 1999

(30) Foreign Application Priority Data

Aug. 28, 1998 (ES) ................................................ 9802224 U

(51) Int. Cl.$^7$ ............................ A23G 1/00; A63H 27/127
(52) U.S. Cl. ........................... 426/104; 426/134; 446/38; 446/239; 446/240; 446/386
(58) Field of Search .................................... 426/104, 134, 426/420, 421; 446/247, 239, 240, 259, 261, 38, 40, 386

(56) References Cited

U.S. PATENT DOCUMENTS

| | | | |
|---|---|---|---|
| 1,383,795 | * | 7/1921 | Fowler .................................... 446/42 |
| 2,799,587 | * | 7/1957 | Schwartz .............................. 426/104 |
| 3,140,954 | * | 7/1964 | Schroeder ............................. 426/104 |
| 3,229,414 | * | 1/1966 | Bross ...................................... 446/38 |
| 3,237,342 | * | 3/1966 | Bross ...................................... 446/36 |
| 5,209,692 | * | 5/1993 | Coleman et al. ....................... 446/71 |
| 5,391,107 | * | 2/1995 | Coleman ............................. 448/484 |
| 5,676,988 | * | 10/1997 | Coleman et al. ..................... 426/134 |

FOREIGN PATENT DOCUMENTS

716766 * 8/1965 (CA) .

* cited by examiner

Primary Examiner—Gabrielle Brouillette
Assistant Examiner—Sherry A. Dauerman
(74) Attorney, Agent, or Firm—Pennie & Edmonds LLP

(57) ABSTRACT

The present invention relates to a device for rotating an item, particularly an edible item. The edible item may be a confectionary product and preferably is a frozen dessert. The device includes a lower handle intended as a holder, an intermediate pinion inside a box, and a support assembly that supports the edible product. The support assembly is integral with the intermediate pinion and rotates freely with respect to the lower handle. The edible product is rotated by inserting a slender rack between the pinion and the inner face of the box in such a way that it meshes with the pinion so that its transverse movement gives rise to a rotation of the pinion and, consequently, rotation of the edible product supported on the support assembly.

13 Claims, 4 Drawing Sheets

FIG. 2
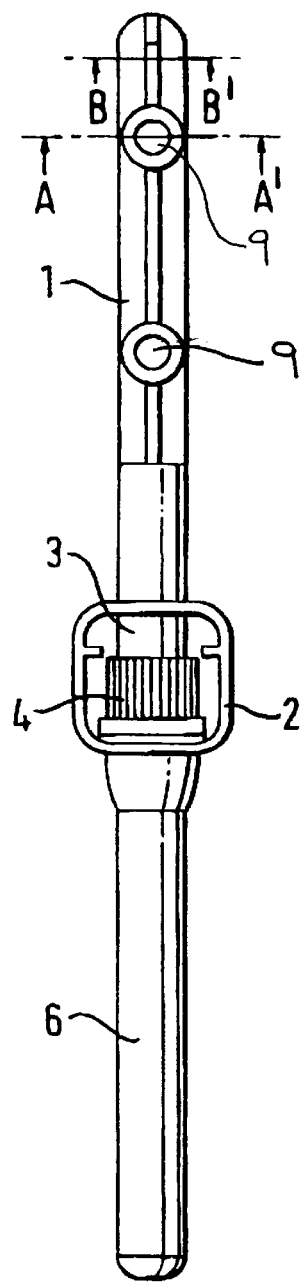
B-B'
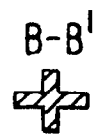
FIG. 2A
A-A'
FIG. 2B
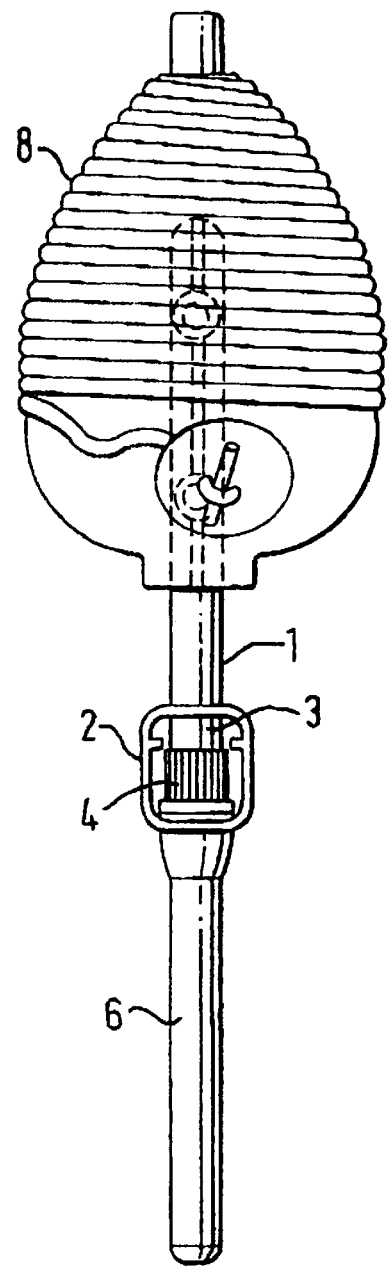
FIG. 3

ROTATABLE FROZEN CONFECTIONARY PRODUCT

TECHNICAL FIELD

The subject of the present invention is a device that can be used to rotate an object such as an edible product. Thus, the invention also relates to a confectionary product having a stick that supports an edible product and enables the user to rotate the edible product, as desired. In particular the edible product can be a frozen edible product such as an ice lolly.

BACKGROUND

A wide variety of articles for consumption by a user that are supported by various types of wooden or plastic holder-sticks are currently available on the market. When consuming a frozen dessert in a constant and regular manner, the user has to rotate the frozen dessert by hand in order to gain access to all sides of the dessert. Rotating the dessert by hand is inconvenient and has the risk that the frozen dessert may be dropped or drip and perhaps stain clothing. Furthermore, after the frozen dessert has been consumed, the dessert's stick has to be discarded since it has no other use. Thus, there is a need for improved devices to support articles for consumption that do not require rotating the dessert by hand. Furthermore, it would be desirable if the device had another use so that it would not have to be discarded. The present invention provides such a device.

SUMMARY OF THE INVENTION

The present invention relates to a device for rotating an item that includes an item and a holder-stick for supporting the item. The holder-stick includes a lower hollow handle and a rotatable assembly. The rotatable assembly includes a support assembly having first and second ends wherein the first end is positioned within the lower handle for rotational movement therein, a pinion member associated with the support assembly, and a housing for surrounding at least the pinion member, an item-support element fixedly attached to the second end of the support assembly and upon which the item is fixedly attached to the item support element, and a rack strip for insertion into the housing and having teeth which engage the pinion when so inserted such that transverse movement of the rack imparts rotation to the pinion, the support assembly and the item secured thereto.

The support assembly may be a rod having first and second ends wherein the first end is inserted in the hollow handle to facilitate rotation therein and wherein the pinion is attached to the rod. The support assembly may further include an intermediate support component having first and second ends wherein the first end is wider than the second end and wherein the first end is attached to the second end of the rod to hold the pinion on the rod.

When the device includes an intermediate support assembly the housing of the support assembly may be a box having an upper face, a lower face, and two lateral faces, wherein the upper and lower faces each have a coaxial hole and the diameter of the coaxial hole on the upper face is sufficiently large to receive the second end of the intermediate support component but smaller than the first end of the intermediate support component; wherein the rod passes through the coaxial hole on the lower face of the box, the hollow handle is attached to the lower face of the box, the intermediate support component and pinion are contained within the box such that the intermediate support component and the pinion can freely rotate in the box, the second end of the intermediate support component emerges from the coaxial hole in the upper face of the box, with the item support element attached to the second end of the intermediate support component.

In one embodiment the interior of the box has two lateral projections formed by a flat surface that is perpendicular to the upper and lower faces of the box and interrupted by the intermediate support component and pinion that forms a chamber, and the upper face of the box is trapped between the first end of the intermediate support component and the item support element.

The rod may be square or star-shaped and the pinion may have a hollow central opening that has a cross section that mates with the shape of the rod to fixingly engage the same.

The item support element may have a star shaped cross section and include at least two transverse holes for anchoring the edible product thereon.

The pinion may have a toothed exterior and the rack strip may be a substantially elongated, narrow, flattened strip that has a series of teeth on one or both of its two principal faces and a circular holder on one of its ends such that the teeth of the rack strip can mesh with the toothed exterior of the pinion.

The item may be an edible product, a gadget or a toy.

The invention also relates to a confectionary product that includes an edible product mounted on the item support element of the device for rotating an item described herein. The edible product may be a frozen confectionary product.

The confectionary product may further be combined with a gadget or game to connect to the second end of the support assembly, after the edible product has been consumed, to make a toy. The gadget or game may be a whisk, a spinning top, a rotary toy, or a flying toy.

The invention also relates to a method for converting an edible product into a toy that includes the steps of providing the device for rotating an item described herein wherein the item is an edible product mounted on the item support element, consuming the edible product, and placing a rotatable toy component upon the item support element after the edible product is consumed to form the toy. The method may further include playing with the toy by rotating the toy component with the rack strip.

BRIEF DESCRIPTION OF THE DRAWINGS

FIG. 2 shows a view of the frozen dessert stick in elevation and details of two sections of the upper part in planes A–A' (FIG. 2A) and B–B' (FIG. 2B);

FIG. 3 shows a view of the stick in perspective, incorporating the frozen dessert;

DESCRIPTION OF A PREFERRED EMBODIMENT

The present invention relates to a device for rotating an item. In particular the item can be an edible item. Thus, the invention also relates to a confectionary product that includes an edible product and a holder-stick, for supporting the edible product. The edible item may be a frozen dessert.

The holder-stick comprises a lower handle intended as a holder to be grasped by the hand, an intermediate pinion inside a box, and an upper extension of a rod that supports the edible product. The upper-rod extension is integral with the intermediate pinion and rotates freely with respect to the lower handle. The edible product is rotated by inserting a slender rack between the pinion and the inner face of the box in such a way that it meshes with the pinion so that its transverse movement gives rise to a rotation of the pinion and, consequently, rotation of the edible product supported on the upper rod. In this way, the user rotates the edible product as desired. The improved confectionary product is particularly desirable for frozen edible products and facilitates consumption of the edible product by rotating it inside the mouth.

The term "edible product" is meant to include any product that may be consumed. Edible products include, but are not limited to, candy, chocolate, cake, fruit, and frozen edible products. The term "frozen edible product" is meant to include, but not limited to, ice-cream, water ice, sherbet, and sorbet. The frozen edible product may be a core that is coated or uncoated and may include inclusions.

Figure 1:
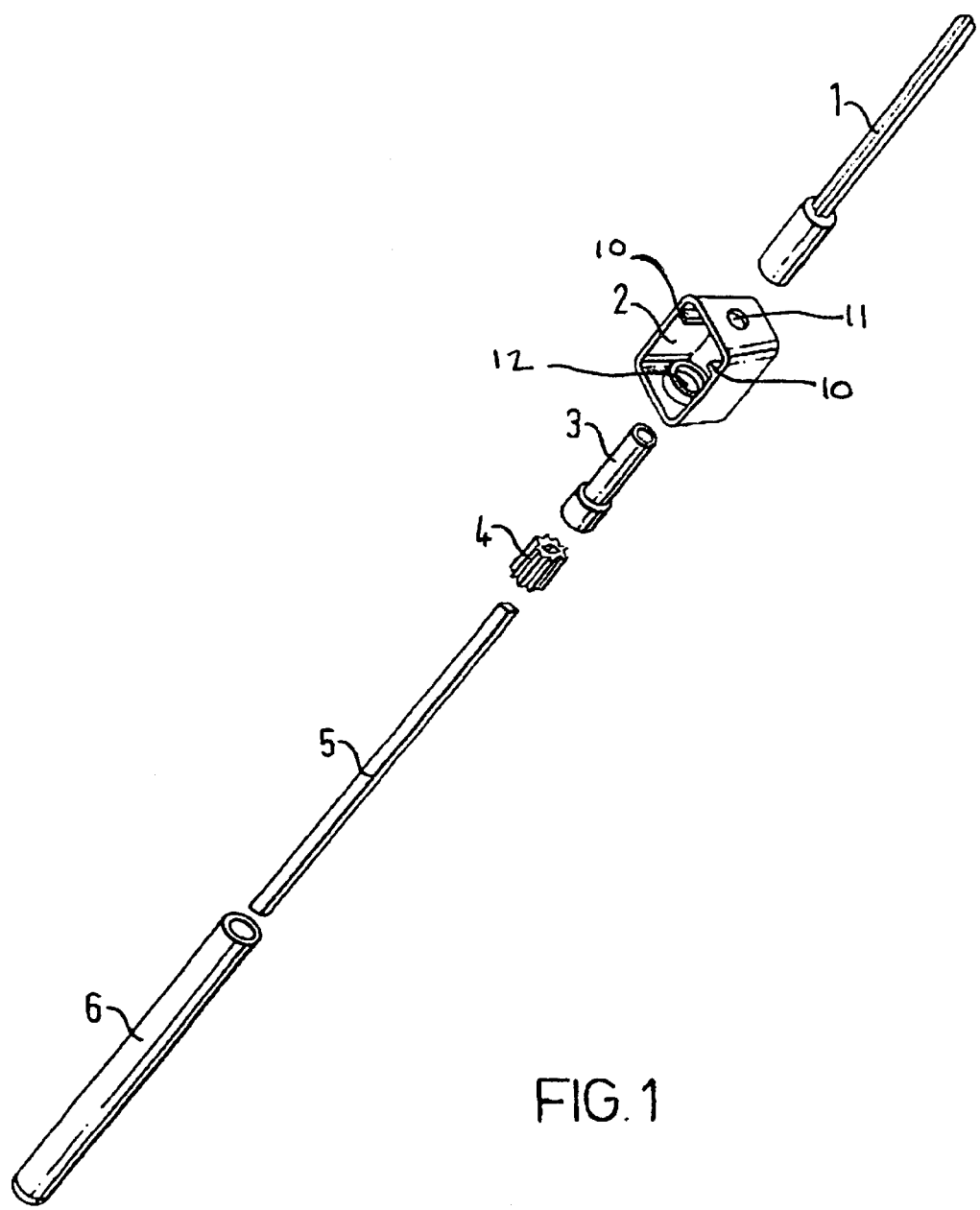
FIG. 1 shows an exploded view of the frozen dessert-support stick.

A preferred, although non-limiting, embodiment of the invention is described in FIGS. 1–3. The frozen edible product holder-stick comprises a lower handle (6), of cylindrical shape having a hollow inside, which is open at the top end and which accommodates a rod (5) which rotates freely inside, and projects in a significant manner from the upper opening of the lower handle (6). The rod is substantially elongated and has a square or star-shaped cross section. The top end of the rod (5) is joined securely to a pinion (4) and to an intermediate support component (3) which holds the item support element (1), the box (2), and the pinion (4). The intermediate support component (3) and the pinion (4) are located inside a small box (2) and rotate freely with respect to the box. Both the intermediate support component (3) and pinion (4) are integral with the rod (5). The intermediate support component (3) and pinion (4) may be attached to the rod (5) by any means including, but not limited to, welding, brazing, soldering, press fitting, and gluing. The top of the intermediate support component (3) is attached to the item support element (1), so that the upper face of the small box (2) is trapped between intermediate support component (3) and the item support element (1). The upper end of the intermediate support component (3) and the lower part of the item support may also be attached by any means.

The pinion (4) is cylindrical in shape, with a toothed exterior suitable for meshing with a rack (7). The interior of the pinion (4) has a hollow that has a cross section that is a square or star shape and is suitable for being secured by coupling to the rod (5) and transmitting its rotary movement to the rod (5).

The intermediate support component (3) has a cylindrical shape with a re-entrant step in its generatrix that defines a stop surface to prevent the intermediate support component (3) from emerging from the top of the small box (2) and whose projecting upper end meshes with the lower part of the item support element (1).

The item support element (1), has a substantially elongated shape and has a hollow, cylindrical lower part suitable for integral assembly with the intermediate support component (3) and an axially elongated upper part with a rounded end, whose cross section has the shape of a star and which has a transverse hole (9) at each of at least two points along its length, to form a suitable anchoring point for the edible product during the product's consumption.

The central small box (2) has the shape of a rectangular box which is slightly elongated in the axial direction of the stick, with rounded corners, and without two opposite lateral faces via which the rack is inserted. Inside, there are two lateral projections (10) formed by a flat surface which are perpendicular to the axial axis of the stick and interrupted by the intermediate support component (3) and the pinion (4), forming a chamber in which the rack (7) is inserted. In the center of the upper face of the box (2) there is a hole (11) through which the upper end of the intermediate support component (3) passes. On the lower face of the box (2) there is another hole (12) through which the rod (5) passes. The box (2) is secured to the holder-handle (6) by the lower face. The lower-handle and box may be secured by any means. For example, if the lower-handle and box are metal they may be secured by an adhesive, soldering, brazing, or welding and if the lower-handle and box are plastic they may be secured by gluing or press fitting.

Figure 5:
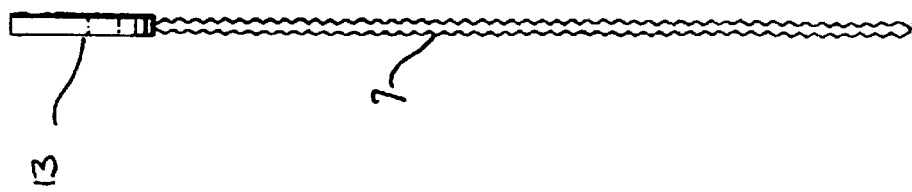
FIG. 5 shows a profile view of the rack strip.
Figure 4:
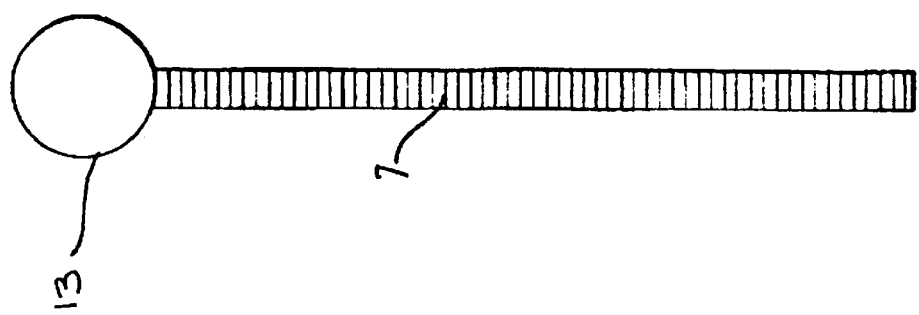
FIG. 4 shows a plan view of the rack strip.
Figure 7:
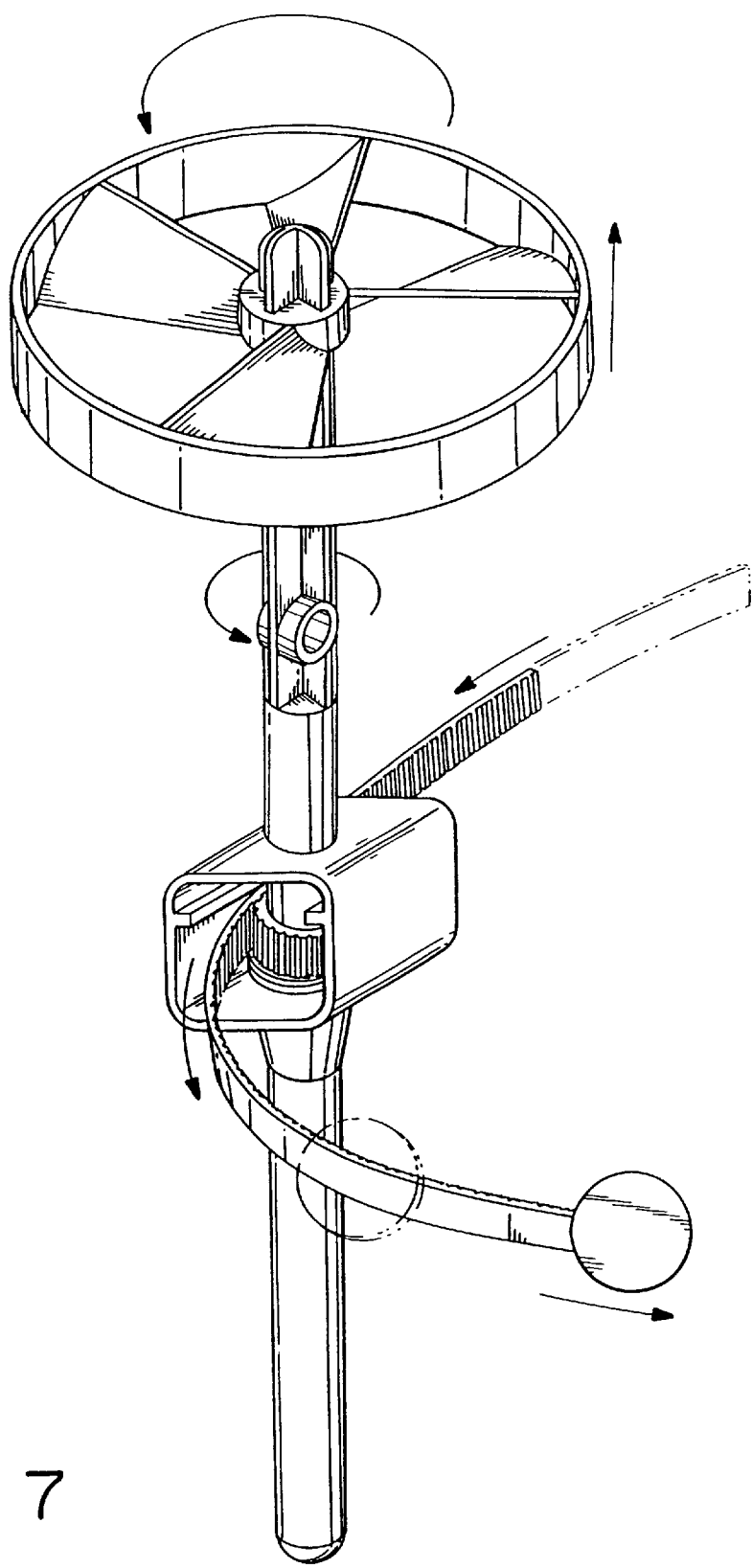
FIG. 7 shows a view of the stick in perspective, incorporating a flying toy.

The rack (7) consists of a substantially elongated, narrow, flattened strip of rectangular cross section which has a row of teeth on both surfaces (FIG. 5) for engaging with the pinion (4). At one end of the rack there is a circular holder end-piece (13).

The edible product is rotated by moving the rack (7) after it is inserted in the small box (2), which gives rise to a rotary movement of the item support element (1), the intermediate support component (3), the pinion (4), and the rod (5), which are integral with the edible product, with respect to the box (2) and the lower handle (6) which are stationary with respect to the user's hand.

The top of the item support element (1) may have a shape that makes it suitable for attaching various accessories that convert the holder-stick into a toy such as, but not limited to, a whisk, a spinning top, a rotary toy, or flying toy, after the edible product has been consumed.

Figure 6:
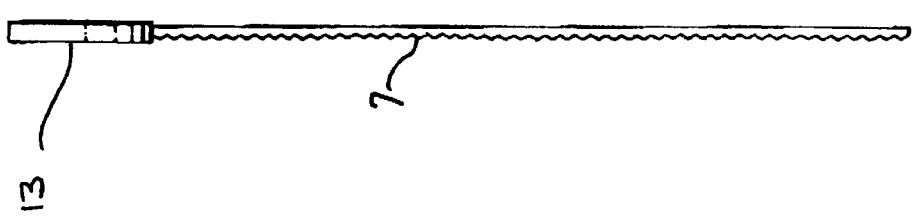
FIG. 6 shows a profile view of an alternative embodiment of the rack stick.

FIG. 6 shows another embodiment of the invention. In the embodiment of FIG. 6, the rack stick is also of rectangular cross section and has a flat external surface and a toothed internal surface for engaging with the pinion (4). The flat external surface slides freely along the internal wall of the box (2).

What is claimed is:

1. A device for rotating an edible frozen confectionery item comprising:
    an edible frozen confectionery item; and
    a holder-stick for supporting the edible frozen confectioner item comprising:
        a lower hollow handle;
        a rotatable assembly which includes:
            a support assembly having first and second ends wherein the first end is positioned within the lower handle for rotational movement therein;
            a pinion member associated with the support assembly; and
            a housing for surrounding at least the pinion member;
        an item-support element fixedly attached to the second end of the support assembly and upon which the edible frozen confectionery item is fixedly attached to the item-support element; and
        a rack strip for insertion into the housing and having teeth which engage the pinion when so inserted such that transverse movement of the rack imparts rotation to the pinion, the support assembly, and the edible frozen confectionery item secured thereto.

2. The device of claim 1 wherein the support assembly includes a rod having first and second ends wherein the first end is inserted in the hollow handle to facilitate rotation therein and wherein the pinion is attached to the rod.

3. The device of claim 2 wherein the support assembly further includes an intermediate support component having first and second ends wherein the first end is wider than the second end and wherein the first end is attached to the second end of the rod to hold the pinion on the rod.

4. The device of claim 3 wherein the housing of the support assembly comprises a box having an upper face, a lower face, and two lateral faces, wherein the upper and lower faces each have a coaxial hole and the diameter of the coaxial hole on the upper face is sufficiently large to receive the second end of the intermediate support component but smaller than the first end of the intermediate support component; wherein the rod passes through the coaxial hole on the lower face of the box, the hollow holder is attached to the lower face of the box, the intermediate support component and pinion are contained within the box such that the intermediate support component and the pinion can freely rotate in the box, the second end of the intermediate support component emerges from the coaxial hole in the upper face of the box, with the item support element attached to the second end of the intermediate support component.

5. The device of claim 4 wherein the interior of the box has two lateral projections formed by a flat surface that is perpendicular to the upper and lower faces of the box and interrupted by the intermediate support component and pinion that forms a chamber, and the upper face of the box is trapped between the first end of the intermediate support component and the item support element.

6. The device of claim 4 wherein the rod is square or star-shaped and the pinion has a hollow central opening that has a cross section that mates with the shape of the rod to fixingly engage the same.

7. The device of claim 1 wherein the item support element has a star shaped cross section and include at least two transverse holes for anchoring the edible frozen confectionery item thereon.

8. The device of claim 1 wherein the pinion has a toothed exterior and the rack strip comprises a substantially elongated, narrow, flattened strip that has a series of teeth on one or both of its two principal faces and a circular holder on one of its ends such that the teeth of the rack strip can mesh with the toothed exterior of the pinion.

9. A frozen confectionary product comprising:

an edible frozen confectionery item; and a holder-stick for supporting the edible frozen confectionery item comprising:
   a lower hollow handle;
   a rotatable assembly which includes:
      a support assembly having first and second ends wherein the first end is positioned within the lower handle for rotational movement therein;
      a pinion member associated with the support assembly; and
      a housing for surrounding at least the pinion member;
   a product-support element fixedly attached to the second end of the support assembly and upon which the edible frozen confectionery item is fixedly attached to the product-support element; and
   a rack strip for insertion into the housing and having teeth which engage the pinion when so inserted such that transverse movement of the rack imparts rotation to the pinion the support assembly, and the edible frozen confectionery item secured thereto.

10. The confectionary product of claim 9 in further combination with a gadget or game to connect to the second end of the support assembly, after the edible product has been consumed, to make a toy.

11. The confectionary product of claim 9 wherein the gadget or game is selected from the group consisting of a whisk, a spinning top, a rotary toy, and a flying toy.

12. A method for converting a frozen confectionery product into a toy comprising:

providing the frozen confectionary product of claim 9;

consuming the edible frozen confectionery item; and placing a rotatable toy component upon the item support element after the edible frozen confectionery item is consumed to form the toy.

13. The method of claim 12 which further comprises playing with the toy by rotating the toy component with the rack strip.

* * * * *

UNITED STATES PATENT AND TRADEMARK OFFICE
CERTIFICATE OF CORRECTION

PATENT NO. : 6,221,409 B1
DATED : April 24, 2001
INVENTOR(S) : Ceresuela

It is certified that error appears in the above-identified patent and that said Letters Patent is hereby corrected as shown below:

Column 4,
Lines 47-48, change confectioner" to -- confectionery --.

Column 6,
Line 23, change "pinion the" to -- pinion, the --.

Signed and Sealed this

Twenty-eighth Day of August, 2001

Attest:

NICHOLAS P. GODICI
Attesting Officer
Acting Director of the United States Patent and Trademark Office